(12) United States Patent
Quan et al.

(10) Patent No.: US 9,386,423 B2
(45) Date of Patent: Jul. 5, 2016

(54) APPARATUS AND METHODS FOR ACCESS IDENTIFIER BASED MULTICAST COMMUNICATION

(71) Applicant: QUALCOMM Incorporated, San Diego, CA (US)

(72) Inventors: Zhi Quan, Livermore, CA (US); Maarten Menzo Wentink, Breukelen (NL); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 13/720,382

(22) Filed: Dec. 19, 2012

(65) Prior Publication Data

US 2013/0229969 A1 Sep. 5, 2013

Related U.S. Application Data

(60) Provisional application No. 61/605,897, filed on Mar. 2, 2012.

(51) Int. Cl.
*H04H 20/71* (2008.01)
*H04W 4/06* (2009.01)
*H04L 12/18* (2006.01)
(52) U.S. Cl.
CPC ............. *H04W 4/06* (2013.01); *H04L 12/185* (2013.01); *H04L 12/189* (2013.01)
(58) Field of Classification Search
None
See application file for complete search history.

(56) References Cited

U.S. PATENT DOCUMENTS

| 6,965,580 | B1* | 11/2005 | Takagi et al. ................ 370/312 |
|---|---|---|---|
| 8,068,447 | B2 | 11/2011 | Meier et al. |
| 2003/0035423 | A1* | 2/2003 | Beckmann et al. .......... 370/390 |
| 2004/0156384 | A1* | 8/2004 | Rune et al. .................... 370/432 |
| 2005/0135291 | A1* | 6/2005 | Ketchum et al. ............. 370/319 |
| 2005/0276237 | A1 | 12/2005 | Segal et al. |
| 2006/0126505 | A1* | 6/2006 | Denney et al. ............... 370/229 |
| 2007/0201468 | A1* | 8/2007 | Jokela .......................... 370/390 |
| 2007/0274246 | A1 | 11/2007 | Stephens |
| 2009/0080365 | A1 | 3/2009 | Song et al. |
| 2009/0122734 | A1* | 5/2009 | Kim et al. ..................... 370/310 |
| 2010/0189021 | A1* | 7/2010 | He et al. ....................... 370/311 |
| 2010/0246580 | A1* | 9/2010 | Kaganoi ............... H04L 12/185 370/390 |
| 2010/0322196 | A1* | 12/2010 | Cherian et al. ............... 370/332 |
| 2012/0063335 | A1 | 3/2012 | Cho et al. |
| 2012/0163292 | A1 | 6/2012 | Kneckt et al. |

(Continued)

FOREIGN PATENT DOCUMENTS

EP 2048823 A1 4/2009
WO 2008104095 A1 9/2008

OTHER PUBLICATIONS

International Search Report and Written Opinion—PCT/US2013/028381—ISA/EPO—Jun. 3, 2013.

*Primary Examiner* — Otis L Thompson, Jr.
(74) *Attorney, Agent, or Firm* — Joseph Hanasz

(57) ABSTRACT

Systems, methods, and devices for multicast communications including access identifiers are described herein. In some aspects, a fixed mapping from a multicast device identifier (e.g., multicast MAC address, multicast IP address) to a multicast access identifier is provided. In some aspects, a device may transmit a request to join a multicast group identified by a multicast access identifier. In some aspects, a device may receive an invitation to join a multicast group identified by a multicast access identifier.

64 Claims, 6 Drawing Sheets

(56) References Cited

U.S. PATENT DOCUMENTS

2013/0051331 A1* 2/2013 Bao et al. .................. 370/329
2013/0195001 A1* 8/2013 Liu ............................ 370/312
2013/0215815 A1* 8/2013 Narasimhan et al. ......... 370/312
2014/0064261 A1* 3/2014 Wang et al. ................. 370/338
2014/0355509 A1* 12/2014 Zhao ................... H04W 76/021
370/312

* cited by examiner

APPARATUS AND METHODS FOR ACCESS IDENTIFIER BASED MULTICAST COMMUNICATION

CROSS-REFERENCE TO RELATED APPLICATIONS

This application claims a priority benefit under 35 U.S.C. §119(e) from U.S. Provisional Application No. 61/605,897 filed Mar. 2, 2012 the contents of which are hereby incorporated by reference in their entirety.

BACKGROUND

1. Field

The present application relates generally to wireless communications, and more specifically to systems, methods, and devices for access identifier based multicast communication.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units or data frames. The packets may include overhead information (e.g., header information, packet properties, etc.) that helps in routing the packet through the network, identifying the data in the packet, processing the packet, etc. Packets may also include data, for example user data, multimedia content, etc. as might be carried in a payload of the packet.

Accordingly, the header information is transmitted with packets. Such header information may represent a significant portion of the information included in a data packet. The transmission of data in such packets may be inefficient due to the fact that much of the bandwidth for transmitting data may be used to transmit header information as opposed to transmission of the actual data. Furthermore, the use of longer identifiers, such as an identifier for the sending device or receiving device of the packet, may increase the resources consumed to transmit and receive the data. The resources may include power, processing time, processing resources, network bandwidth, and airtime. Use of compressed identifiers, such as an access identifier (AID), has been proposed to reduce the quantity of data transmitted. An identifier may be compressed by shortening the length of the identifier associated with a given device. This may be useful for communication with one specific device. However, in some implementations, it may be desirable to transmit a message to multiple devices. In some systems, transmitting a message to multiple devices may be referred to as "multicasting." For example, if three devices are conducting an instant message session via a chat service, a message sent by one device may be sent to the other two devices involved in the instant message session. Accordingly, improved systems, methods, and devices which include the shortened identifier and allow multicasting are desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include multicasting through the use of access identifiers.

In one aspect, a method of assigning an identifier to a multicast group in a wireless network is provided. The method includes obtaining a first portion of the identifier, the first portion indicating the identifier includes a value identifying a multicast group. The method further includes obtaining a second portion of the identifier, the second portion including the value identifying the multicast group. The method also includes associating at least one multicast address for the multicast group with the identifier. In some implementations, associating the multicast address includes mapping one or more bits (e.g., least significant bit(s), most significant bit(s)) of the multicast address to the value identifying the multicast group.

In some implementations, the identifier includes an access identifier. The multicast address may include one or more of a multicast MAC address or a multicast IP address. The identifier may have a length less than the length of the multicast address. The first portion may have a length less than the length of the second portion. In some implementations, the first portion may include the most significant bits of the identifier while the second portion may include the least significant bits of the identifier.

In another aspect, an apparatus for communicating in a wireless network is provided. The apparatus includes a processor configured to obtain a first portion of an identifier for a multicast group, the first portion indicating the identifier includes a value identifying the multicast group. The processor is further configured to obtain a second portion of the identifier, the second portion of the identifier including the value identifying the multicast group. The processor is also configured to associate at least one multicast address with the identifier.

In a further innovative aspect, a computer-readable medium comprising instructions executable by a processor of an apparatus is provided. The instructions cause the apparatus to obtain a first portion of an identifier for a multicast group, the first portion indicating the identifier includes a value identifying the multicast group. The instructions further cause the apparatus to obtain a second portion of the identifier the second portion including the value identifying the multicast group. The instructions additionally cause the apparatus to associate at least one multicast address to the identifier.

In a further aspect, an apparatus for communicating in a wireless network is provided. The apparatus includes means for obtaining a first portion of an identifier for a multicast group, the first portion indicating the identifier includes a value identifying the multicast group. The apparatus includes means for obtaining a second portion of the identifier, the second portion including the value identifying the multicast group. The apparatus also includes means for associating at least one multicast address for the multicast group with the identifier.

In a further aspect, a method of multicast group communication is provided. The method includes obtaining an identifier indicating a multicast group to join. The identifier includes a first portion indicating the identifier includes a value identifying a multicast group. The identifier also includes a second portion. The second portion includes the value identifying the multicast group. The method also includes filtering subsequently received messages based at least in part on the identifier.

In some implementations, obtaining the identifier includes transmitting an association request message including the identifier and receiving an association response message. In some implementations, obtaining the identifier includes receiving an association request message including the identifier and transmitting an association response message.

An apparatus for multicast group communication in a wireless network is provided in another innovative aspect. The apparatus includes a transceiver configured to obtain an association an identifier indicating a multicast group to join. The identifier includes a first portion indicating the identifier includes a value identifying a multicast group. The identifier also includes a second portion including the value identifying the multicast group to join. The apparatus further includes a processor configured to filter subsequently received messages based at least in part on the identifier.

In yet another aspect, another computer-readable medium comprising instructions executable by a processor of an apparatus is provided. The instructions cause the apparatus to obtain an identifier indicating a multicast group to join, the identifier including a first portion indicating the identifier includes a value identifying a multicast group, the identifier including a second portion, the second portion including the value identifying the multicast group. The instructions further cause the apparatus to filter subsequently received messages based at least in part on the identifier.

In one aspect, another apparatus for multicast group communication in a wireless network is provided. The apparatus includes means for obtaining an identifier indicating a multicast group to join, the identifier including a first portion indicating the identifier includes a value identifying a multicast group, the identifier including a second portion, the second portion including the value identifying the multicast group. The apparatus also includes means for filtering subsequently received messages based at least in part on the identifier.

In another aspect, a further method of joining a multicast group is described. The method includes receiving an identifier indicating a multicast group from a device, the identifier including a first portion indicating the identifier includes a value identifying a multicast group, the identifier including a second portion, the second portion including the value identifying the multicast group. The method also includes associating the device with the indicated multicast group.

In one aspect, a further apparatus for multicast group communication in a wireless network is provided. The apparatus includes a transceiver configured to receive an identifier indicating a multicast group from a device, the identifier including a first portion indicating the identifier includes a value identifying a multicast group, the identifier including a second portion, the second portion including the value identifying the multicast group. The apparatus also includes a processor configured to associate the device with the indicated multicast group.

In another aspect, further computer-readable medium comprising instructions executable by a processor of an apparatus is provided. The instructions cause the apparatus to receive an identifier indicating a multicast group from a device, the identifier including a first portion indicating the identifier includes a value identifying a multicast group, the identifier including a second portion, the second portion including the value identifying the multicast group. The instructions cause the apparatus to associate the device with the identified multicast group.

In a further aspect, another apparatus for communicating in a wireless network is provided. The apparatus includes means for receiving an identifier indicating a multicast group from a device, the identifier including a first portion indicating the identifier includes a value identifying a multicast group, the identifier including a second portion, the second portion including the value identifying the multicast group. The apparatus also includes means for associating the device with the indicated multicast group.

DETAILED DESCRIPTION

Figure 1:
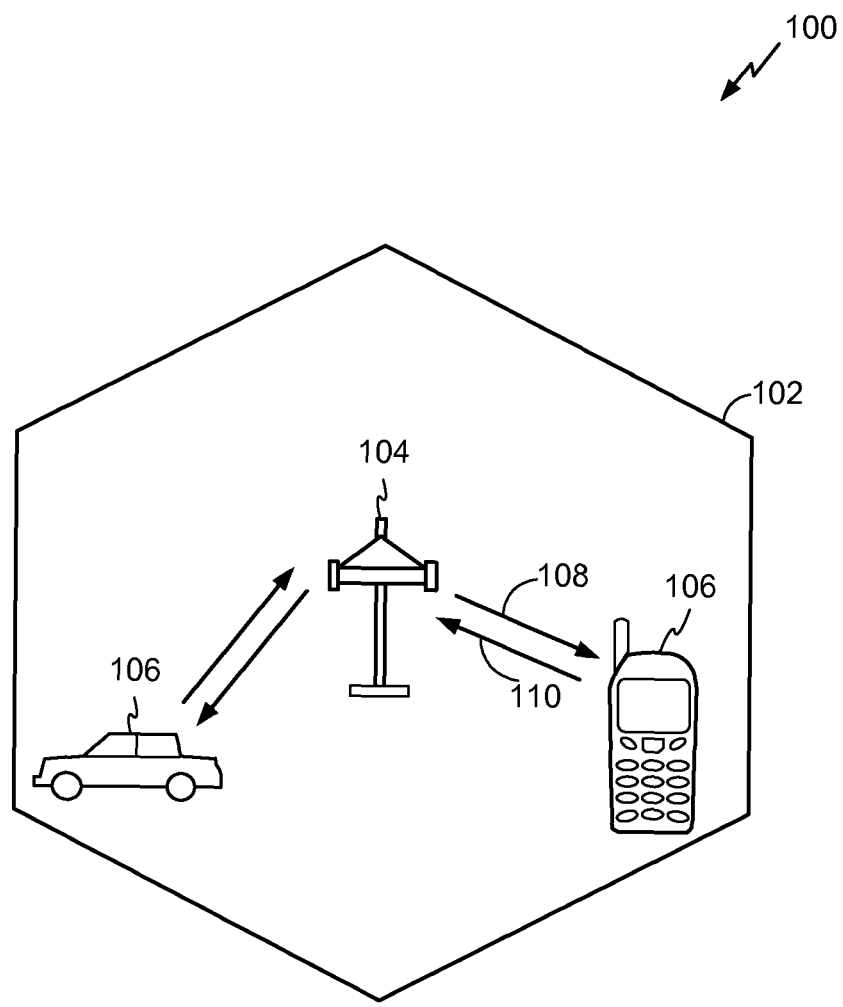
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. Further, in some aspects, STAs 106 may communicate directly with each other and form a direct link (direct) between each other.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. In another example, the functions of the AP 104 described herein may alternatively be performed by one or more of the STAs 106.

Figure 2:
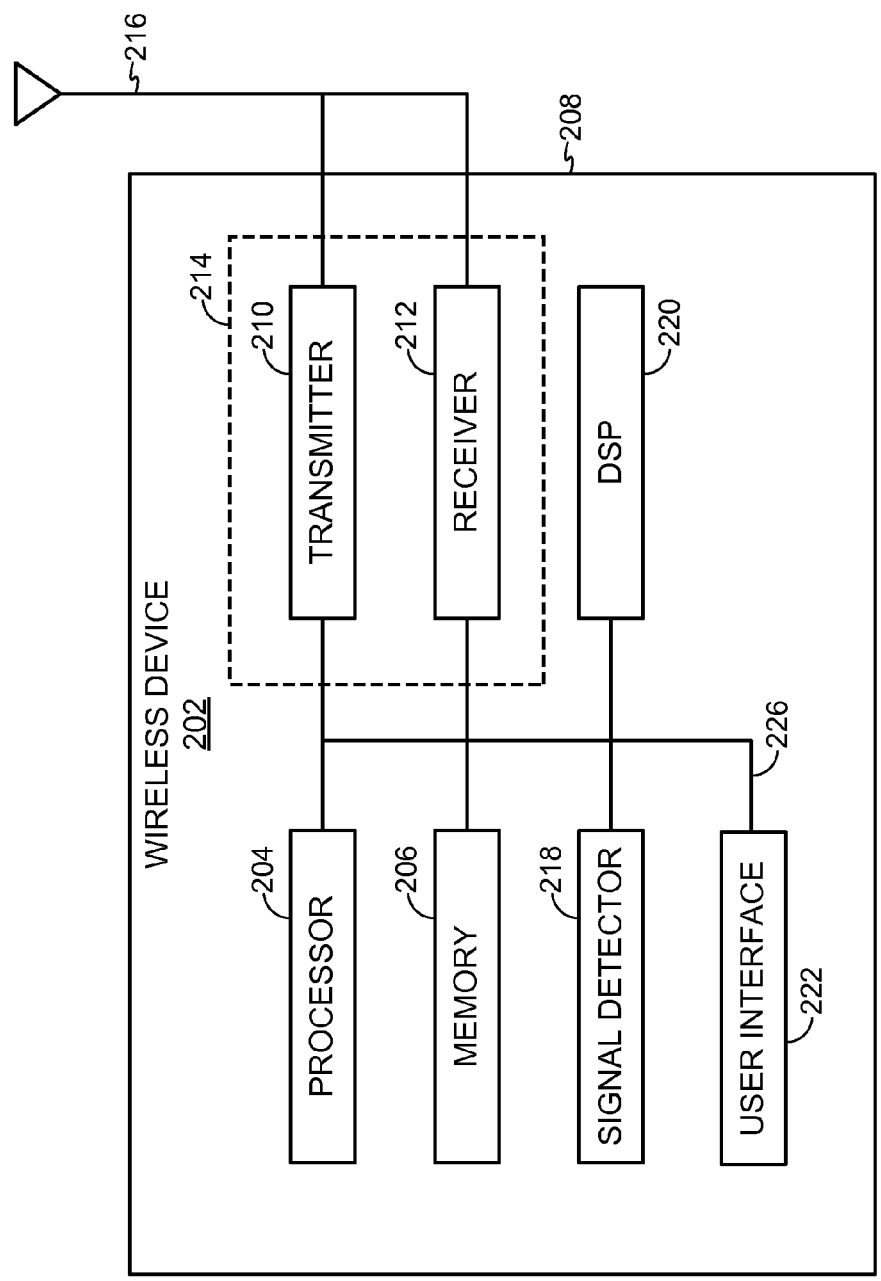
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of access identifier (AID) types, and to generate a packet including the AID type. For example, the processor 204 may be configured to generate a packet comprising a unicast AID which identifies a specific device to receive the transmitted packet. As another example, the processor 204 may be configured to generate a packet comprising a multicast AID which identifies a group of devices to receive the transmitted packet. Identification of a group of devices will be described in further detail below. As a further example, the processor 204 may be configured to generate a packet comprising a broadcast AID which indicates all devices may receive the transmitted packet.

When the wireless device 202 is implemented or used as a receiving node, the processor 204 may be configured to process packets of a plurality of different AID types. For example, the processor 204 may be configured to determine the type of AID type used in a packet and process or ignore the packet accordingly, as will be further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets including an access identifier. For example, the transmitter 210 may be configured to transmit packets with different types of access identifiers (e.g., unicast, multicast, broadcast) generated by the processor 204, discussed above.

The receiver 212 may be configured to wirelessly receive packets including an access identifier. In some aspects, the receiver 212 is configured to detect a type of access identifier included in the packet and process the packet accordingly, as will be discussed in further detail below.

The wireless device 202 may also include a signal detector 218 that may be used to detect and quantify the level of signals received by the transceiver 214. The signal detector 218 may detect such signals as total energy, energy per subcarrier per symbol, power spectral density, and other signals. The wireless device 202 may also include a digital signal processor (DSP) 220 configured to process signals. The DSP 220 may also be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as one or more of a power bus, a control signal bus, and a status signal bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive communications having a plurality of AID types (e.g., unicast, multicast, broadcast).

Figure 3:
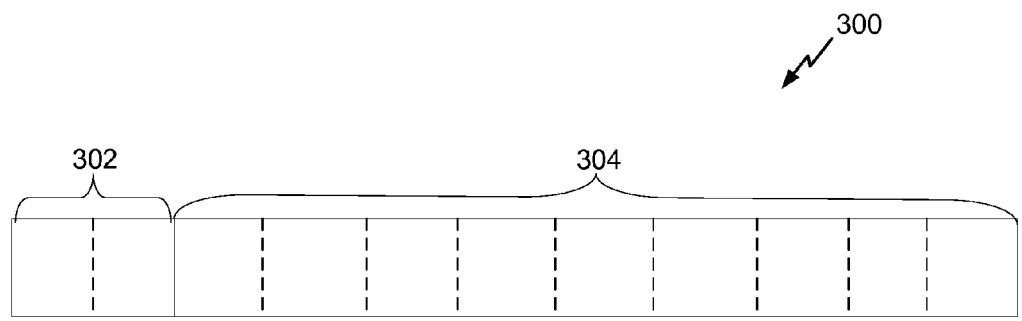
FIG. 3 shows an exemplary format for a multicast access identifier.

FIG. 3 shows an exemplary format for a multicast access identifier. An access identifier (AID) may uniquely identify a device in a particular BSA, but may not necessarily uniquely identify the device globally. An AID can be included in a shortened MAC header for addressing a specific device. In some implementations, the AID may be 13 bits as compared to a 48 bit MAC address. In an implementation including 13 bit AID values, 8192 AIDs may be represented. In some implementations, a portion of the possible AIDs may not be needed. For example, a device may be configured to provide a service to a fixed number of devices which is less than the number of AIDs capable of being represented using the provided bits. In such implementations, the unused AIDs may be repurposed for multicasting.

The multicast AID format shown in FIG. 3 is an example for a system including thirteen bit AIDs wherein a first portion 302 is allocated two fields. The two fields may include two bits to identify the AID as an identifier including a value associated with a multicast group. For example, a given AID may be identified as a multicast AID if the fields of the first portion are set to "1s". As shown, the first portion 302 includes the most significant bits of the multicast AID. In some implementations, it may be desirable to reserve the two least significant bits or other pre-determined bit locations for identifying the AID as a multicast AID. Furthermore, it will be appreciated that while the example shown includes two bits in the first portion 302, one bit or more than two bits may be used. The processing of the message including an AID may include obtaining the AID from the received packet. For example, the AID may be located in a header field. Once obtained, the first portion of the AID may be obtained to determine what type the AID is. If the first portion includes a value indicating the AID includes a value identifying a multicast group, the AID may be processed as a multicast identifier. Otherwise, the AID may be processed as a unicast or broadcast identifier.

As shown in FIG. 3, a second portion 304 is allocated the remaining eleven fields. In some implementations the second portion 304 may include a value identifying a specific multicast group. The eleven fields may include eleven bits are used to identify a specific multicast group. In the example shown, using eleven bits, 2048 multicast groups may be identified.

shown in FIG. 3, two bits are allocated as the first portion. At block 404, a second portion of the multicast AID is obtained. The second portion may include a value identifying a specific multicast group. The number of multicast groups identifiable may be limited to the values which can be specified using the second portion. At block 406, a total number of multicast MAC addresses available are identified. The identification may include retrieving the available MAC addresses from a memory (e.g., device configuration). At block 408, blocks of identified multicast MAC addresses are allocated to each multicast AID. The allocation may include assigning a range of multicast MAC addresses to a given value included in the second portion. The range may be sequential addresses and/or determined based on a calculation (e.g., random distribution, round robin distribution).

Figure 4:
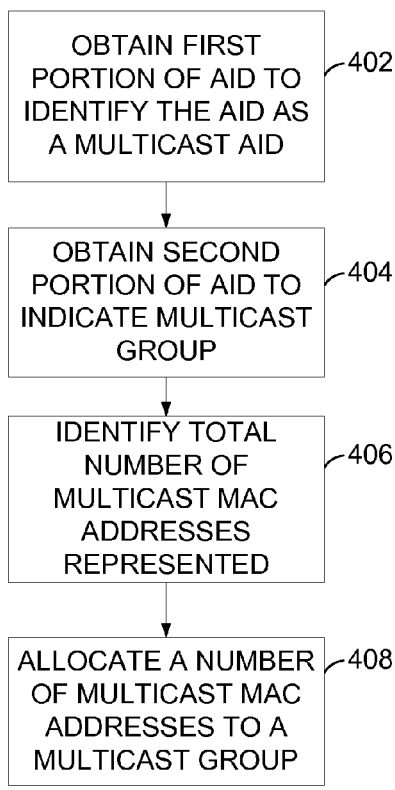
FIG. 4 shows a process for mapping a multicast MAC address to a multicast AID.

As an example mapping according to FIG. 4, consider a system including thirteen bit AIDs and 48 bit MAC addresses. The thirteen bit AID may be divided into a first portion of two bits and a second portion of eleven bits. Accordingly, $2^{11}$ multicast groups may be represented by the second portion. The system may be configured to reserve a set of MAC addresses for multicasting. For example, the system may utilize the 48 bit MAC address to represent $2^{23}$ multicast MAC addresses. By mapping the lower order eleven bits of the multicast MAC address to second portion of eleven bits included in the multicast AID, a grouping including $2^{12}$ multicast MAC addresses may be identified by a multicast AID. TABLE 1 below shows an example of this mapping. The multicast MAC address ranges illustrate the least significant twelve bits outside the brackets with the implication that within the brackets, the remaining 36 bits are included in the multicast MAC address.

TABLE 1

| Group | Multicast AID (2 bits specifying AID type; 11 bits for group identifier value) | Multicast MAC Address Range Start (48 bits) | Multicast MAC Address Range End (48 bits) |
| --- | --- | --- | --- |
| 1 | 1100000000001 | [...00]000000000001 | [...00]111111111111 |
| 2 | 1100000000010 | [...01]000000000001 | [...01]111111111111 |
| . | . | . | . |
| . | . | . | . |
| . | . | . | . |
| $2^{11}$ | 1111111111110 | [...11]000000000001 | [...11]111111111111 |

A non-limiting advantage of the allocation shown in FIG. 3 is to allow an access identifier to be used for specifying multicast groups. As discussed above, in some systems, a subset of access identifiers may be used for identifying specific devices for wireless communication. Unused access identifiers may be repurposed, for example, according to FIG. 3 to allow AIDs to be used for multicast communication.

Having identified a mechanism for representing and transmitting multicast AIDs, the process of mapping a multicast AID to existing multicast identifiers such as a multicast MAC address or a multicast IP address will be described.

FIG. 4 shows a process for mapping a multicast MAC address to a multicast AID. A multicast MAC address is generally considered a data link (e.g., Open Source Interconnect layer two) address. A multicast AID is also generally considered a data link (e.g., Open Source Interconnect layer two) address. The process shown in FIG. 4 illustrates one way to associate data link addresses.

At block 402, a first portion of the AID for identifying the AID as a multicast identifier is obtained. In the multicast AID In some implementations, a broadcast MAC address may be "mapped" to a broadcast AID (i.e., an AID that can be used to identify all devices within the BSS). For example, the system may be configured to identify an AID including all "1's" as a broadcast AID. Other mappings to known values may be included to achieve a similar result.

Figure 5:
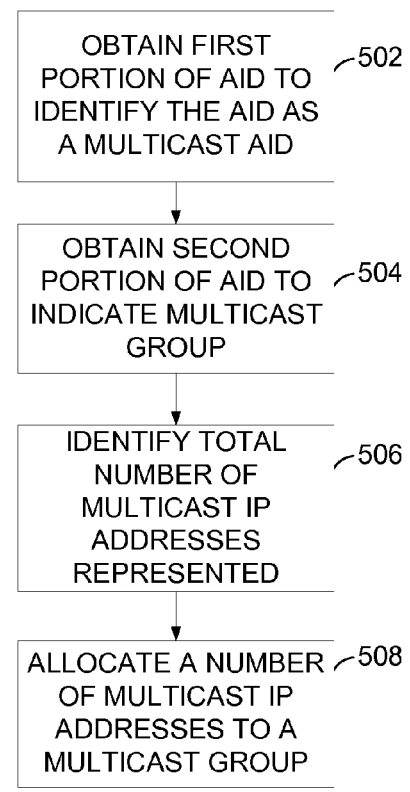
FIG. 5 shows a process for mapping a multicast IP address to a multicast AID.

FIG. 5 shows a process for mapping a multicast IP address to a multicast AID. A multicast IP address is generally considered a network layer (e.g., Source Interconnect layer three) identifier. A multicast AID is generally considered a data link (e.g., Open Source Interconnect layer two) identifier. The process shown in FIG. 5 illustrates one way to associate a data link identifier with a network layer identifier. In some implementations, a multicast IP address may be mapped to a multicast MAC address. In this case, the mapping described in reference to FIG. 4 may be included. In some implementations, it may be desirable to map directly from a multicast IP address to a multicast AID. Some advantages of this direct mapping include saving power in processing, reducing time to process a signal, and reducing overall processing required for a given signal. The process shown in FIG. 5 provides one such direct mapping.

The process begins at block 502 by obtaining a first portion of the AID for identifying the AID as a multicast identifier. In the multicast AID shown in FIG. 3, two bits are allocated as the first portion. At block 504, a second portion is obtained to indicate the multicast group. For example, the remaining bits after the identification of block 502 may be used to identify a specific multicast group. The process continues at block 506 by identifying a total number of multicast IP addresses available. At block 508, blocks of identified multicast IP addresses are allocated to each multicast AID. The allocation may include assigning a range of multicast IP addresses to a given value included in the second portion. The range may be sequential addresses and/or determined based on a calculation (e.g., random distribution, round robin distribution).

As an example of a mapping according to FIG. 5, consider a system including thirteen bit AIDs and 32 bit IP addresses. The 13 bit AID may be divided into a first portion of two bits and a second portion of eleven bits. Accordingly, $2^{11}$ multicast groups may be represented by the second portion. Multicast IP addresses may include a fixed number of high order bits identifying the IP address as part of a class of multicast addresses. For example, multicast IP addresses may be identified as within the class D address space. In one example, four bits of the IP address may be used to indicate the IP address is a multicast IP address. Removing these fixed four bits from consideration, the multicast IP address thus includes 28 bits remaining. Accordingly, $2^{28}$ multicast IP addresses may be represented using the multicast IP address low order bits. These low order 28 bits of the multicast IP addresses may be mapped to the low order bits of a multicast AID. By mapping the lower order seventeen bits of the multicast IP address to second portion of eleven bits included in the multicast AID, groupings each including $2^{17}$ multicast IP addresses may be identified and each associated with a multicast AID. TABLE 2 below shows an example of this multicast IP address mapping. The multicast IP address ranges illustrate the least significant 28 bits outside the brackets with the implication that within the brackets, the remaining 4 bits are included in the multicast IP address.

that this simplified call flow diagram does not include intermediate entities that may be included to support the processing of the messages shown. For example, the AP 604 may be configured to utilize an access authorization and accounting service to perform one or more of the actions described.

Figure 6:
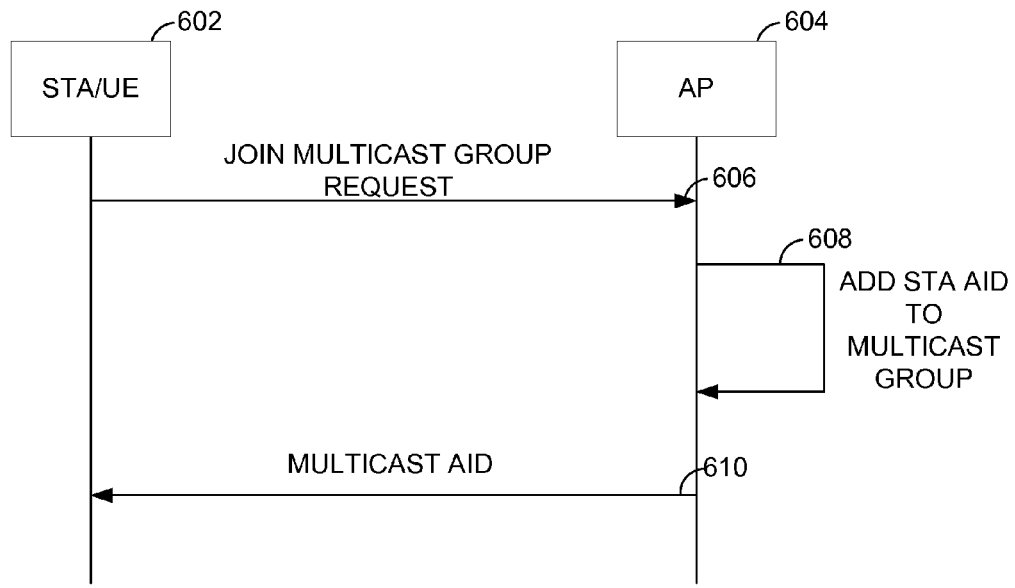
FIG. 6 shows a call flow diagram for joining a multicast group.

In the call flow shown in FIG. 6, the STA/UE 602 knows the multicast group it wants to join. For example, the STA/UE 602 may be configured with the identifier for the multicast group for an application. The configuration may be stored in the memory of the STA/UE 602. When the STA/UE 602 initializes the multicast application, this value is obtained. A message 606 is transmitted to the AP 604 requesting to join the multicast group. In some implementations the message 606 may be referred to as an "association request message." The message 606 includes a multicast AID associated with the group the STA/UE 602 wants to join. For example, the group may be associated with a multicast chat server. In some implementations, the message 606 may identify more than one group to join. In such implementations, the message 606 may include multiple identifiers each corresponding with a multicast group. The message 606 may also include an identifier for the STA/UE 602 such as an AID.

The AP 604 performs messaging 608 to add the STA/UE 602 to the requested group. The messaging 608 may include validating the specified multicast AID as properly formatted. Proper formatting may include the appropriate length and/or values for each field. The messaging 608 may include determining whether the identified multicast group is an active group. The determination may include a look-up of active multicast groups at the AP 604 or via another network entity. The messaging 608 may include verifying the STA/UE 602 is configured to join the group. The verification may include, for example, determining whether the STA/UE 602 is configured for adequate bandwidth and/or capabilities (e.g., audio, video, location services (e.g., GPS)) to join the multicast group. The messaging 608 may include authorization of the STA/UE 602 to join the group. The authorization may include subscription check, accounting, and quality of service processing for the STA/UE 602. If the STA/UE 602 is added to the group, the adding may include storing the multicast AID in a memory. Other activities may be performed prior to adding the STA/UE 602 to the group.

TABLE 2

| Group | Multicast AID (2 bits specifying AID type; 11 bits for group identifier value) | Multicast IP Address Range Start (32 bits) | Multicast IP Address Range End (32 bits) |
|---|---|---|---|
| 1 | 1100000000001 | [ . . . 00]0000000000000000000000000001 | [ . . . 00]1111111111111111111111111111 |
| 2 | 1100000000010 | [ . . . 01]0000000000000000000000000001 | [ . . . 01]1111111111111111111111111111 |
| . | . | . | . |
| . | . | . | . |
| . | . | . | . |
| $2^{11}$ | 1111111111110 | [ . . . 11]0000000000000000000000000001 | [ . . . 11]1111111111111111111111111111 |

Having addressed how to map from multicast group identifiers (e.g., IP address, MAC address) to the multicast AID identifiers, various systems and methods for multicast group communication will be discussed.

FIG. 6 shows a call flow diagram for joining a multicast group. The call flow diagram illustrates messages exchanged between a STA/UE 602 and an AP 604. It will be appreciated If added, the AP 604 may transmit a message 610 to the STA/UE 602 indicating the successful addition to the multicast AID group. In some implementations, the message 610 may be referred to as an "association response message." The message 610 may include the multicast AID assigned to the group. This information may be stored by the STA/UE 602 and used as an address filter for subsequently received messages. For example, if the STA/UE 602 receives a message with the recipient identified as the AID of the STA/UE 602 or as the multicast AID of the group the STA/UE 602 has joined, the STA/UE 602 will process the message. If the message does not identify the STA/UE 602 or a group it is associated with, the STA/UE 602 may preserve processing resources by ignoring the message.

Figure 7:
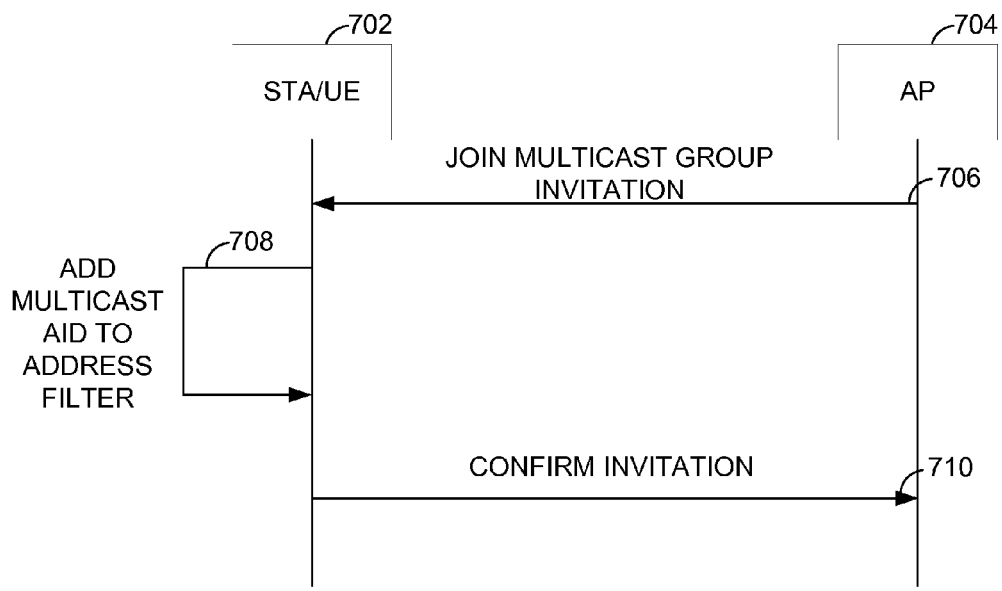
FIG. 7 shows another call flow diagram for joining a multicast group.

FIG. 7 shows another call flow diagram for joining a multicast group. The call flow diagram illustrates messages exchanged between a STA/UE 702 and an AP 704. It will be appreciated that this simplified call flow diagram does not include intermediate entities that may be included to support the processing of the messages shown. For example, the AP 704 may be configured to utilize an access authorization and accounting service to perform one or more of the actions described.

In the call flow shown in FIG. 7, the AP 704 may identify the STA/UE 702 as a member of a multicast group. In some implementations, the AP 704 may generally advertise the multicast group without identifying the STA/UE 702 a priori. For example, if the AP 704 is a multicast chat AP in a restaurant for patrons, the AP 704 may be configured to invite all STAs/UEs in the service area to join the multicast group for the restaurant.

A message 706 is transmitted to the STA/UE 702 inviting membership in the multicast group. In some implementations, the message 706 may be referred to as an "association request message." The message 706 includes a multicast AID associated with the group the STA/UE 702 is invited to join. For example, the group may be associated with a multicast chat server. In some implementations, the message 706 may identify more than one group to join. In such implementations, the message 706 may include multiple AIDs corresponding with each group. The message 706 may also include an identifier for the STA/UE 702 and/or the AP 704 such as an AID.

The STA/UE 702 performs messaging 708 to add the multicast AID to its address filter. The messaging 708 may include validating the specified multicast AID as properly formatted. Proper formatting may include the appropriate length and/or values for each field. The messaging 708 may include determining whether the identified multicast group is an active group. The determination may include a look-up of active multicast groups at the AP 704 or via another network entity. The determination may include a look-up of applications executing at the STA/UE 702. If the application associated with the multicast group has been terminated or otherwise suspended execution, the group may be considered inactive. The messaging 708 may include verifying the STA/UE 702 is configured to join the group. The verification may include, for example, determining whether the STA/UE 702 is configured for adequate bandwidth and/or capabilities (e.g., audio, video, location services (e.g., GPS)) to join the multicast group. The messaging 708 may include authorization of the STA/UE 702 to join the group. The authorization may include subscription check, accounting, and quality of service processing for the STA/UE 702. If the STA/UE 702 is added to the group, the adding may include storing the multicast AID and/or information identifying the STA/UE 702 in a memory.

If the STA/UE 702 decides to join the indicated group, a message 710 is transmitted confirming the request. In some implementations, the message 710 may be referred to as an "association response message." The AP 704 may be configured to maintain a list of invitations and upon receipt of the message 710, add the STA/UE 702 to the multicast group. The AP 704 may associate a timer with each invitation and, if no response is received before the timer expires, the invitation may no longer be responded to. As such, if the message 710 is received after expiration, the STA/UE 702 will not be added to the multicast group. A message (not shown) indicating such a condition may be transmitted to the STA/UE 702 from the AP 704.

Figure 8:
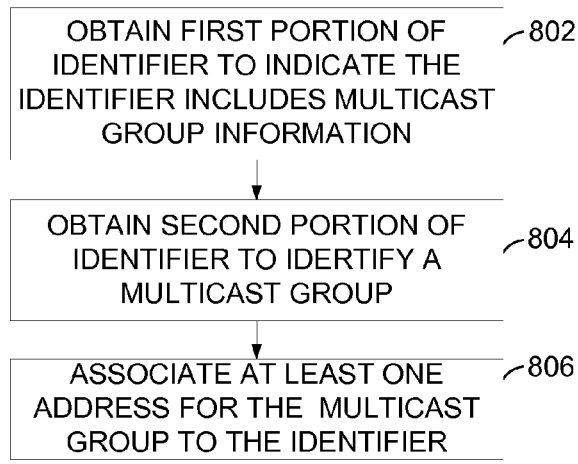
FIG. 8 shows a process diagram for an exemplary method of multicast AID mapping.

FIG. 8 shows a process diagram for an exemplary method of assigning an identifier to a multicast group in a wireless network. The assignment may be performed at an AP or an STA. The assignment may be provided to an AP or an STA. For example, the assignment may be transmitted to the AP or STA from a network component through, for example, wireless message or backhaul messaging. In some implementations, the assignment may be stored in memory (e.g., SIM card) of a device accessing the network. The process may be implemented in one or more of the devices described herein.

At block 802, a first portion of the identifier is obtained to indicate the identifier includes a value identifying a multicast group. At block 804, a second portion of the identifier is obtained. The second portion includes the value identifying the multicast group. At block 806, at least one multicast address is associated with the identifier.

Figure 9:
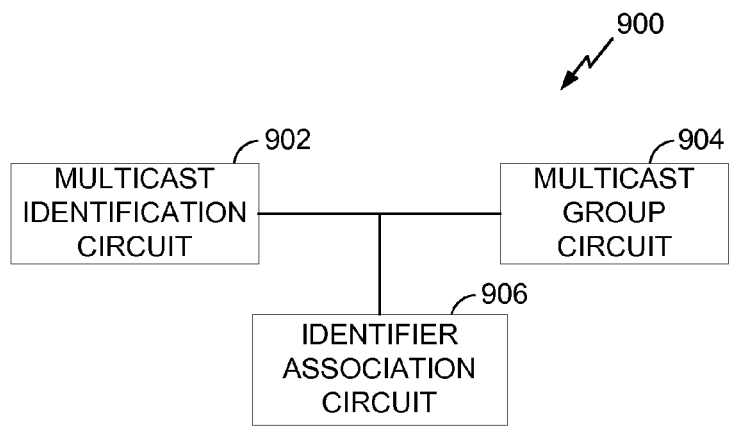
FIG. 9 shows a functional block diagram for another exemplary wireless device that may be employed within the wireless communication system of FIG. 1.

FIG. 9 shows a functional block diagram for another exemplary wireless device that may be employed within the wireless communication system of FIG. 1. The exemplary wireless communication device 900 may be configured to implement one or more of the methods described above. The wireless communication device 900 may encompass a STA or an AP.

Those skilled in the art will appreciate that a wireless communication device may have more components than the simplified wireless communication device 900 shown in FIG. 9. The wireless communication device 900 shown includes only those components useful for describing some prominent features of certain implementations. The wireless communication device 900 includes a multicast identification circuit 902, a multicast group circuit 904, and an identifier association circuit 906.

In some implementations, the multicast identification circuit 902 is configured to identify a first portion of an identifier to indicate the identifier includes the multicast group identifier. The multicast identification circuit 902 may include one or more of a processor, a comparator, and a memory. In some implementations, means for identifying the first portion of an identifier may include the multicast identification circuit 902.

In some implementations, the multicast group circuit 904 is configured to identify a second portion of the identifier to indicate the multicast group identified by the multicast group identifier. The multicast group circuit 904 may include one or more of a processor, a comparator, a memory, and an arithmetic processor. In some implementations, means for identifying a second portion of the identifier may include the multicast group circuit 904.

In some implementations, the identifier association circuit 906 is configured to associate at least one multicast identifier to the multicast group identifier. The identifier association circuit 906 may include one or more of a comparator, a processor, a memory, and a transmitter. In some implementations, means for associating may include the identifier association circuit 906.

Figure 10:
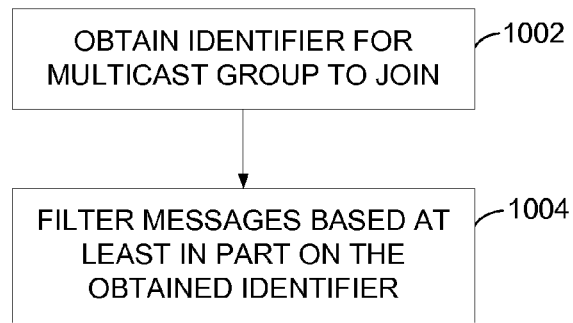
FIG. 10 shows a process diagram for another exemplary method of multicast AID mapping.

FIG. 10 shows a process diagram for another exemplary method of multicast AID mapping. The process may be implemented in one or more of the devices, such as an STA, as described herein. At block 1002, an identifier indicating a multicast group to join is obtained. The identifier includes a first portion indicating the identifier includes a value identifying a multicast group. The identifier also includes a second portion including the value identifying the multicast group. The obtaining may be performed by transmitting an association request message and receiving an association response message. In some implementations, the identifier may be obtained by receiving an association request message and transmitting an association response message.

At block 1004, messages are filtered based at least in part on the multicast group identifier. The filtering may include comparing an identifier value included in a subsequently received message to the identifier obtained at block 1002. If the message includes the identifier, the message may be considered related to the multicast group and processed further (e.g., decoded). If the message does not include the identifier, the message may not be processed any further.

Figure 11:
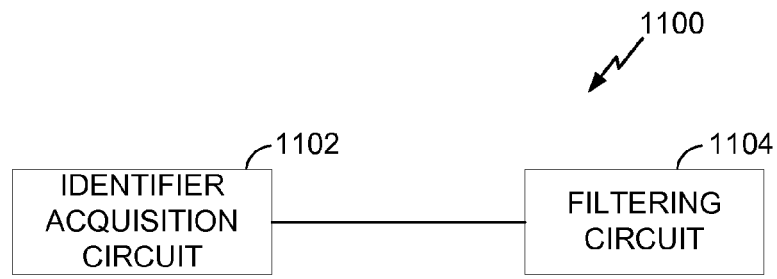
FIG. 11 shows a functional block diagram for a further exemplary wireless device that may be employed within the wireless communication system of FIG. 1.

FIG. 11 shows a functional block diagram for a further exemplary wireless device that may be employed within the wireless communication system of FIG. 1. The exemplary wireless communication device 1100 may be configured to implement one or more of the methods described above. The wireless communication device 1100 may encompass a STA.

Those skilled in the art will appreciate that a wireless communication device may have more components than the simplified wireless communication device 1100 shown in FIG. 11. The wireless communication device 1100 shown includes only those components useful for describing some prominent features of certain implementations. The wireless communication device 1100 includes an identifier acquisition circuit 1102 and a filtering circuit 1104.

In some implementations, identifier acquisition circuit 1102 configured to obtaining an identifier indicating a multicast group to join, the identifier including a first portion indicating the identifier includes a value identifying a multicast group, the identifier including a second portion including the value identifying the multicast group. The identifier acquisition circuit 1102 may include one or more of a transmitter, receiver, transceiver, signal processor, and an antenna. In some implementations, means for obtaining an identifier indicating a multicast group to join include the identifier acquisition circuit 1102.

In some implementations, the filtering circuit 1104 is configured to filter subsequently received messages based at least in part on the identifier. The filtering circuit 1104 may include one or more of a receiver, an antenna, a processor, a comparator, and a digital signal processor. In some implementations, means for filtering received messages include the filtering circuit 1104.

Figure 12:
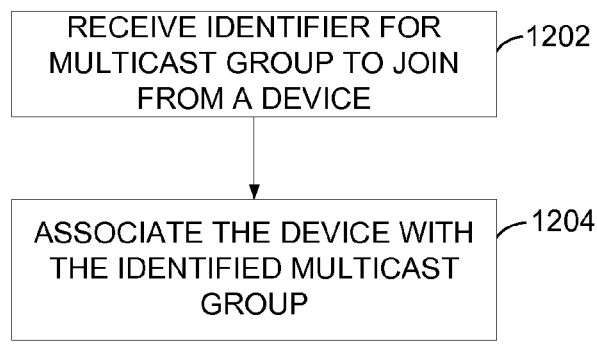
FIG. 12 shows a process diagram for another exemplary method of multicast group communication.

FIG. 12 shows a process diagram for another exemplary method of multicast group communication. The process shown in FIG. 12 may be implemented in one or more of the devices described herein such as in an AP. At block 1202, an identifier indicating a multicast group to join is received from a device. At block 1204, the device is associated with the multicast group identified by the identifier received at block 1202.

Figure 13:
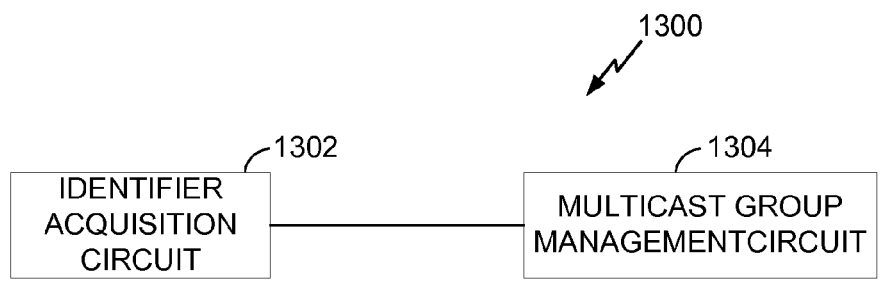
FIG. 13 shows a functional block diagram for a further exemplary wireless device that may be employed within the wireless communication system of FIG. 1.

FIG. 13 shows a functional block diagram for a further exemplary wireless device that may be employed within the wireless communication system of FIG. 1. The exemplary wireless communication device 1300 may be configured to implement one or more of the methods described above. The wireless communication device 1300 may encompass an AP.

Those skilled in the art will appreciate that a wireless communication device may have more components than the simplified wireless communication device 1300 shown in FIG. 13. The wireless communication device 1300 shown includes only those components useful for describing some prominent features of certain implementations. The wireless communication device 1300 includes an identifier acquisition circuit 1302 and a multicast group management circuit 1304.

In some implementations, the identifier acquisition circuit 1302 is configured to receive an identifier indicating a multicast group from a device, the identifier including a first portion indicating the identifier includes a value identifying a multicast group, the identifier including a second portion, the second portion including the value identifying the multicast group. The identifier acquisition circuit 1302 may include one or more of a transmitter, a receiver, and an antenna. In some implementations, means for receiving an identifier indicating a multicast group from a device may include the identifier acquisition circuit 1302.

In some implementations, the multicast group management circuit 1304 is configured to associate the device with the multicast group identified in by the received identifier. The multicast group management circuit 1304 may include one or more of a memory, a processor, and a comparator. In some implementations, means for associating the device with the indicated multicast group may include the multicast group management circuit 1304.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of assigning an identifier to a multicast group in a wireless network, the method comprising:
    obtaining a first portion of the identifier, the first portion including a value indicating a type of the identifier, the type being selected from a group comprising a multicast type, a broadcast type, and a unicast type; and
    if the value indicates that the identifier is the multicast type:
        obtaining a second portion of the identifier, the second portion identifying a multicast group; and
        associating at least one multicast address for the multicast group with the identifier, wherein the identifier is included in a header field of a media access control (MAC) header.

2. The method of claim 1, wherein the identifier is an access identifier.

3. The method of claim 1, wherein the at least one multicast address comprises one or more of a multicast MAC address and a multicast Internet Protocol (IP) address.

4. The method of claim 1, wherein the identifier has a length shorter than the at least one multicast address.

5. The method of claim 1, wherein the first portion has a length shorter than the second portion.

6. The method of claim 1, wherein associating the at least one multicast address comprises mapping one or more bits of the at least one multicast address to the value.

7. The method of claim 6, wherein the one or more bits comprise the least significant bits of the identifier.

8. The method of claim 1, wherein the first portion comprises the most significant bits of the identifier, and wherein the second portion comprises the least significant bits of the identifier.

9. The method of claim 1, wherein the value indicates that the identifier is the broadcast type.

10. The method of claim 9, wherein the identifier is an access identifier.

11. The method of claim 1, wherein obtaining the first portion of the identifier comprises at least one of retrieving the first portion from a memory and calculating the first portion based on another value stored in memory.

12. The method of claim 1, wherein obtaining the second portion of the identifier comprises generating the value based on a multicast address associated with the multicast group.

13. The method of claim 1, wherein the identifier is comprised of exactly 13 bits.

14. The method of claim 1, wherein the identifier is non-unique on a global network level.

15. An apparatus for communicating in a wireless network, the apparatus comprising a processor configured to:
obtain a first portion of an identifier, the first portion including a value indicating a type of the identifier, the type being selected from a group comprising a multicast type, a broadcast type, and a unicast type; and
if the value indicates that the identifier is the multicast type:
obtain a second portion of the identifier, the second portion identifying a multicast group; and
associate at least one multicast address for the multicast group with the identifier, wherein the identifier is included in a header field of a media access control (MAC) header.

16. The apparatus of claim 15, wherein the identifier is an access identifier.

17. The apparatus of claim 15, wherein the at least one multicast address comprises one or more of a multicast MAC address and a multicast Internet Protocol (IP) address.

18. The apparatus of claim 15, wherein the identifier has a length shorter than the at least one multicast address.

19. The apparatus of claim 15, wherein the first portion has a length shorter than the second portion.

20. The apparatus of claim 15, wherein associating the at least one multicast address comprises mapping one or more bits of the at least one multicast address to the value.

21. The apparatus of claim 20, wherein the one or more bits comprise the least significant bits of the identifier.

22. The apparatus of claim 15, wherein the first portion comprises the most significant bits of the identifier, and wherein the second portion comprises the least significant bits of the identifier.

23. The apparatus of claim 15, wherein the value indicates that the identifier is the broadcast type.

24. The apparatus of claim 23, wherein the identifier is an access identifier.

25. The apparatus of claim 15, wherein obtaining the first portion of the identifier comprises at least one of retrieving the first portion from a memory and calculating the first portion based on another value stored in memory.

26. The apparatus of claim 15, wherein obtaining the second portion of the identifier comprises generating the value based on a multicast address associated with the multicast group.

27. The apparatus of claim 15, wherein the identifier is comprised of exactly 13 bits.

28. The apparatus of claim 15, wherein the identifier is non-unique on a global network level.

29. A non-transitory computer-readable medium comprising instructions executable by a processor of an apparatus, the instructions causing the apparatus to:
obtain a first portion of an identifier, the first portion including a value indicating a type of the identifier, the type being selected from a group comprising a multicast type, a broadcast type, and a unicast type; and
if the value indicates that the identifier is the multicast type:
obtain a second portion of the identifier, the second portion identifying a multicast group; and
associate at least one multicast address for the multicast group with the identifier, wherein the identifier is included in a header field of a media access control (MAC) header.

30. An apparatus for communicating in a wireless network, the apparatus comprising:
means for obtaining a first portion of an identifier, the first portion including a value indicating a type of the identifier, the type being selected from a group comprising a multicast type, a broadcast type, and a unicast type; and
if the value indicates that the identifier is the multicast type:
means for obtaining a second portion of the identifier, the second portion identifying a multicast group; and
means for associating at least one multicast address for the multicast group with the identifier, wherein the identifier is included in a header field of a media access control (MAC) header.

31. A method of multicast group communication, the method comprising:
obtaining an identifier indicating a multicast group to join, the identifier including a first portion including a value indicating a type of the identifier, the type being selected from a group comprising a multicast type, a broadcast type, and a unicast type; and
if the value indicates that the identifier is the multicast type:
the identifier including a second portion identifying a multicast group; and
filtering subsequently received messages based at least in part on the identifier, wherein the identifier is included in a header field of a media access control (MAC) header.

32. The method of claim 31, wherein obtaining the identifier comprises:
transmitting an association request message, the association request message including the identifier; and
receiving an association response message, the association response message including the identifier.

33. The method of claim 32, wherein the association request message includes an identifier for a device transmitting the association request message.

34. The method of claim 33, wherein the identifier for the device transmitting the association request message comprises one of: an access identifier, a MAC address, and an Internet Protocol (IP) address.

35. The method of claim 31, wherein obtaining the identifier comprises:
receiving an association request message including the identifier; and
transmitting an association response message including the identifier.

36. The method of claim 35, wherein the association request message includes an identifier for a device receiving the association request message.

37. The method of claim 36, wherein the identifier for the device receiving the association request message comprises one of: an access identifier, a MAC address, and an IP address.

38. The method of claim 31, wherein the identifier is associated with at least one of: a plurality of multicast IP addresses and a plurality of multicast MAC addresses.

39. The method of claim 31, wherein filtering the subsequently received messages comprises:
identifying a destination identifier included in the subsequently received messages; and
processing the subsequently received messages when the destination identifier is the same as either the identifier indicating the multicast group to join or an identifier for a device receiving the subsequently received messages.

40. An apparatus for multicast group communication in a wireless network, the apparatus comprising:
a transceiver configured to obtain an identifier indicating a multicast group to join, the identifier including a first portion including a value indicating a type of the identifier, the type being selected from a group comprising a multicast type, a broadcast type, and a unicast type; and if the value indicates that the identifier is the multicast type:
- the identifier including a second portion identifying a multicast group; and
- a processor configured to filter subsequently received messages based at least in part on the identifier, wherein the identifier is included in a header field of a media access control (MAC) header.

41. The apparatus of claim 40, wherein the transceiver comprises:
- a transmitter configured to transmit an association request message including the identifier; and
- a receiver configured to receive an association response message including the identifier.

42. The apparatus of claim 41, wherein the association request message further includes an identifier for the apparatus.

43. The apparatus of claim 42, wherein the identifier for the apparatus comprises one of: an access identifier, a MAC address, and an Internet Protocol (IP) address.

44. The apparatus of claim 40, wherein the transceiver comprises:
- a receiver configured to receive an association request message including the identifier; and
- a transmitter configured to transmit an association response message including the identifier.

45. The apparatus of claim 44, wherein the association request message further includes an identifier for the apparatus.

46. The apparatus of claim 45, wherein the identifier for the apparatus comprises one of: an access identifier, a MAC address, and an IP address.

47. The apparatus of claim 40, wherein the identifier is associated with at least one of: a plurality of multicast IP addresses and a plurality of multicast MAC addresses.

48. The apparatus of claim 40, wherein filtering subsequently received messages comprises:
- identifying a destination identifier included in the received messages; and
- processing the received messages when the destination identifier is the same as either the identifier indicating the multicast group to join or an identifier of the apparatus.

49. A non-transitory computer-readable medium comprising instructions executable by a processor of an apparatus, the instructions causing the apparatus to:
- obtain an identifier indicating a multicast group to join, the identifier including a first portion including a value indicating a type of the identifier, the type being selected from a group comprising a multicast type, a broadcast type, and a unicast type; and
- if the value indicates that the identifier is the multicast type:
  - the identifier including a second portion identifying a multicast group; and
  - filter subsequently received messages based at least in part on the identifier, wherein the identifier is included in a header field of a media access control (MAC) header.

50. An apparatus for multicast group communication in a wireless network, the apparatus comprising:
- means for obtaining an identifier indicating a multicast group to join, the identifier including a first portion including a value indicating a type of the identifier, the type being selected from a group comprising a multicast type, a broadcast type, and a unicast type; and if the value indicates that the identifier is the multicast type:
- the identifier including a second portion identifying a multicast group; and
- means for filtering subsequently received messages based at least in part on the identifier, wherein the identifier is included in a header field of a media access control (MAC) header.

51. A method of multicast group communication, the method comprising:
- receiving an identifier indicating a multicast group from a device, the identifier including a first portion including a value indicating a type of the identifier, the type being selected from a group comprising a multicast type, a broadcast type, and a unicast type; and
- if the value indicates that the identifier is the multicast type:
  - the identifier including a second portion identifying a multicast group; and
  - associating the device with the indicated multicast group, wherein the identifier is included in a header field of a media access control (MAC) header.

52. The method of claim 51, wherein receiving the identifier comprises receiving from the device an association request message including the identifier, and wherein associating the device with the indicated multicast group comprises transmitting to the device an association response message including the identifier.

53. The method of claim 51, wherein receiving the identifier comprises:
- transmitting to the device an association request message including the identifier; and
- receiving from the device an association response message including the identifier.

54. The method of claim 53, wherein the identifier is associated with at least one of: a plurality of multicast Internet Protocol (IP) addresses and a plurality of multicast MAC addresses.

55. The method of claim 53, wherein transmitting the association request message comprising generating a timeout value associated with the association request message, and the device is associated with the multicast group if the association response message is received before the generated timeout value.

56. An apparatus for multicast group communication in a wireless network, the apparatus comprising:
- a transceiver configured to receive an identifier indicating a multicast group from a device, the identifier including a first portion including a value indicating a type of the identifier, the type being selected from a group comprising a multicast type, a broadcast type, and a unicast type; and
- if the value indicates that the identifier is the multicast type:
  - the identifier including a second portion identifying a multicast group; and
  - a processor configured to associate the device with the indicated multicast group, wherein the identifier is included in a header field of a media access control (MAC) header.

57. The apparatus of claim 56, wherein the transceiver comprises:
- a transmitter configured to transmit an association request message to the device, the association request message including the identifier; and
- a receiver configured to receive an association response message from the device, the association response message including the identifier.

58. The apparatus of claim 57, the apparatus further comprising a timer configured to generate a timeout value associated with the association request message, wherein the processor is configured to associate the device with the multicast group if the association response message is received before the generated timeout value.

59. The apparatus of claim 56, wherein the transceiver comprises:
- a receiver configured to receive an association request message from the device, the association request message including the identifier; and
- a transmitter configured to transmit an association response message from the device, the association response message including the identifier.

60. The apparatus of claim 59, wherein the association request message further includes an identifier for the device.

61. The apparatus of claim 60, wherein the identifier comprises an access identifier.

62. The apparatus of claim 56, wherein the multicast group identifier is associated with at least one of: a plurality of multicast Internet Protocol (IP) addresses and a plurality of multicast MAC addresses.

63. A non-transitory computer-readable medium comprising instructions executable by a processor of an apparatus, the instructions causing the apparatus to:
- receive an identifier indicating a multicast group from a device, the identifier including a first portion including a value indicating a type of the identifier, the type being selected from a group comprising a multicast type, a broadcast type, and a unicast type; and
- if the value indicates that the identifier is the multicast type:
  - the identifier including a second portion identifying a multicast group; and
  - associate the device with the identified multicast group, wherein the identifier is included in a header field of a media access control (MAC) header.

64. An apparatus for communicating in a wireless network, the apparatus comprising:
- means for receiving an identifier indicating a multicast group from a device, the identifier including a first portion including a value indicating a type of the identifier, the type being selected from a group comprising a multicast type, a broadcast type, and a unicast type; and
- if the value indicates that the identifier is the multicast type:
  - the identifier including a second portion identifying a multicast group; and
  - means for associating the device with the indicated multicast group, wherein the identifier is included in a header field of a media access control (MAC) header.

* * * * *